US008659595B2

(12) United States Patent
Chin et al.

(10) Patent No.: US 8,659,595 B2
(45) Date of Patent: Feb. 25, 2014

(54) METHOD AND SYSTEM FOR COMBINING 2D IMAGE AND 3D MODEL AND NON-TRANSITORY COMPUTER READABLE STORAGE MEDIUM THEREOF

(75) Inventors: Mao-Yuan Chin, Pingtung (TW); Jui-Yi Kuo, Tainan (TW)

(73) Assignee: Institute for Information Industry, Taipei (TW)

(*) Notice: Subject to any disclaimer, the term of this patent is extended or adjusted under 35 U.S.C. 154(b) by 582 days.

(21) Appl. No.: 12/970,627

(22) Filed: Dec. 16, 2010

(65) Prior Publication Data
US 2012/0133640 A1   May 31, 2012

(30) Foreign Application Priority Data
Nov. 26, 2010   (TW) .............................. 99141007 A (51) Int. Cl.
*G06T 15/00* (2011.01)
(52) U.S. Cl.
USPC .......................................... 345/419; 345/649

(58) Field of Classification Search
USPC .................................................. 345/419, 649
See application file for complete search history.

(56) References Cited

U.S. PATENT DOCUMENTS

2006/0126924 A1* 6/2006 Liu et al. ...................... 382/154
2009/0009513 A1* 1/2009 van den Hengel et al. ... 345/420
2011/0187703 A1* 8/2011 Patwardhan et al. ......... 345/419

* cited by examiner

*Primary Examiner* — Maurice L McDowell, Jr.
(74) *Attorney, Agent, or Firm* — Muncy, Geissler, Olds & Lowe, P.C.

(57) ABSTRACT

A method and system for combining a 2D image and a 3D model and a storage medium thereof are provided. A corresponding relation between a general model and a 2D image is established. A system provides an operation interface. Next, functions provided by the operation interface include designating a feature point on the 2D image and specifying a confirmation point corresponding to the feature point on the general model. Finally, according to a viewpoint space vector of the general model, a display space vector of the 2D image is decided. Furthermore, when the operation interface displays the general model according to a specific viewpoint space vector, the 2D image having the corresponding display space vector is selected for display.

21 Claims, 6 Drawing Sheets

METHOD AND SYSTEM FOR COMBINING 2D IMAGE AND 3D MODEL AND NON-TRANSITORY COMPUTER READABLE STORAGE MEDIUM THEREOF

CROSS-REFERENCE TO RELATED APPLICATION

This application claims the benefit of Taiwan Patent Application No. 099141007, filed on Nov. 26, 2010, which is hereby incorporated by reference for all purposes as if fully set forth herein.

BACKGROUND OF THE INVENTION

1. Field of Invention

The present invention relates to a method and system for combining a 2D image and a 3D model and a storage medium thereof, and more particularly to a method and system for combined display of a 2D image and a 3D model and a storage medium thereof which are particularly applicable to a telemedicine system.

2. Related Art

Currently, display of a person, object or space on a network or an application program is still dominated by a 2D image, and in order to enable a viewer to view the person, object or space to be displayed from different angles/positions, usually several 2D images shot at different angles are provided. However, the disadvantage is the lack in stereoscopic feeling and senses of positions. In addition, when a plurality of 2D images at different angles exists, the viewer can only search one by one. When selecting the image to be viewed, the viewer is unable to select a specific position to view instinctively, and also, when viewing a certain 2D image, the viewer also has to imagine or judge from which position to view the 2D image by oneself. For example, in a telemedicine system, when a face of a patient is viewed in a mode of remote video medical consultation, both the doctor and the patient should be on line at the same time, and the doctor is unable to operate as he/she needs to select the angle to view and has to instruct the patient to turn around by himself. Alternatively, when the doctor and the patient are not on line at the same time, the patient can shoot a plurality of photos and send the photos to a system end for doctor diagnosis, and the plurality of photos can only be viewed one by one, such that the doctor is unable to look the patient like as if he/she is on-site diagnosing the patient.

In order to achieve the objective of 3D perspective, conventionally a 3D imaging technology is adopted to establish a 3D model of a person or an object. However, special instruments are needed for the 3D imaging of the 3D space, and the model establishment for a "specific object" has a high cost and is time-consuming, and also has a distortion problem. In commonly seen Panorama, Google Street View services, and Photo Tourism, instead of surrounding views at angles of all positions for the specific object, an external image is viewed circumferentially with positioning points.

For a Panorama, the major technical measure is image stitching, and only simple space relations can be processed, such that an object can't be viewed in different angles through a 3D model. The Google Street View services require special equipment to acquire images and space information to establish space correlation between images. The Photo Tourism (Photo synth) has to use 3D modeling to establish image space, and searches pictures by using relative positions of feature points.

Additionally, in Taiwan, R.O.C. Patent Application No. 098139045, entitled "SYSTEM AND METHOD FOR ESTABLISHING CORRELATION FOR A PLURALITY OF IMAGES AND RECORD MEDIUM THEREOF", pictures are searched according to space correlation, and the technical measure includes establishing image maps to decide abutting relations for space correlation searches. The disadvantage is that if no matching feature point is found between the two images, the abutting relation correlation is unable to be established. Only the abutting relations among images can be known, and images of specific positions are unable to be directly selected.

In addition, in all the conventional technologies, although a relation between a 2D graphic and a 3D model can be established, computer programmers having professional techniques are required to perform data processing, which has a high cost and is time-consuming, and an ordinary people without any processional technique is unable to establish a relation between the 2D graphic and the 3D model by himself.

SUMMARY OF THE INVENTION

The present invention is directed to a method and a system for combining a 2D image and a 3D model and a storage medium thereof, so as to endow the 2D image senses of shapes and positions.

The present invention provides a method and a system for combining a 2D image and a 3D model, in which a general model is pre-stored, a 2D input image is then acquired, and an operation interface is further provided. The operation interface has a 2D operation function and a 3D operation function. The 2D operation function is used for displaying a 2D input image and designating a feature point, while the 3D operation function is used for performing a 3D space display operation on the general model, deciding a viewpoint space vector, displaying the general model, and then specifying a confirmation point corresponding to the feature point on the general model. Finally, according to the viewpoint space vector, a display space vector of the 2D input image is decided.

The present invention further provides a method and system for combining a 2D image and a 3D model, in which a general model is pre-stored, a 2D input image is then acquired, and an operation interface is further provided. The operation interface has a 2D operation function and a 3D operation function. The 2D operation function is used for displaying the 2D input image and designating three feature points, while the 3D operation function is used for performing a 3D space display operation on the general model, specifying three confirmation points respectively corresponding to each feature point on the general model. Finally, a viewpoint space vector is decided according to the three confirmation points, and a display space vector of the 2D input image is decided according to the viewpoint space vector.

The present invention provides a non-transitory storage medium for storing a computer program. The program is loaded by a computer or an electronic device to execute a method for combining a 2D image and a 3D model, which is discussed above and not described here any longer.

In an embodiment of the present invention, in the method and system, after a plurality of 2D input images is acquired, a display space vector of each 2D input image is further decided, respectively. The operation interface displays the general model according to a specific viewpoint space vector. Finally, according to the specific viewpoint space vector and the display space vector of each 2D input image, a 2D input image having the display space vector corresponding to the specific viewpoint space vector is selected to be displayed by the operation interface.

In an embodiment of the present invention, the general model has a 3D space coordinate system, and the general model is a universal 3D model.

In an embodiment of the present invention, the 3D operation function comprises one of operations such as rotating, moving, and zooming in/out the 3D model.

In an embodiment of the present invention, the 2D input image has a camera focal length data, and according to the camera focal length data, the corresponding 2D input image is zoomed in/out when being displayed.

In an embodiment of the present invention, according to a coordinate of a confirmation point in a 3D space coordinate system, a display coordinate of the feature point is decided, when the operation interface displays the general model according to the specific viewpoint space vector, a corresponding 2D input image is selected according to the viewpoint space vector, the coordinate of the confirmation point, the display space vector of the 2D input image, and the display coordinate of the feature point, and the operation interface displays the 2D input image.

According to the method and system of the present invention, a universal 3D model can be used, so as to reduce a building cost, and an ordinary user without any professional technique can also provide a 2D input image/photo and combine the 2D input image with a 3D model through the operation interface, so as to greatly increase the practicality. Subsequently, the viewer can directly operates the general model to view the 2D input image at the corresponding position without aimless searching among many 2D input images or his imagination of positions in the 2D input image corresponding to practical objects/space after viewing the 2D input image, thus greatly increasing the convenience. When the method and system are applied in a telemedicine system, through the general model combined with the 2D input image, communication and evaluation of the medical staff and patients become more convenient, thus increasing accuracy of diagnosing diseases of patients in telemedicine.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the features and advantages of the present invention more comprehensive, the embodiments are illustrated in detail below with reference to the accompanying drawings.

Figure 1:
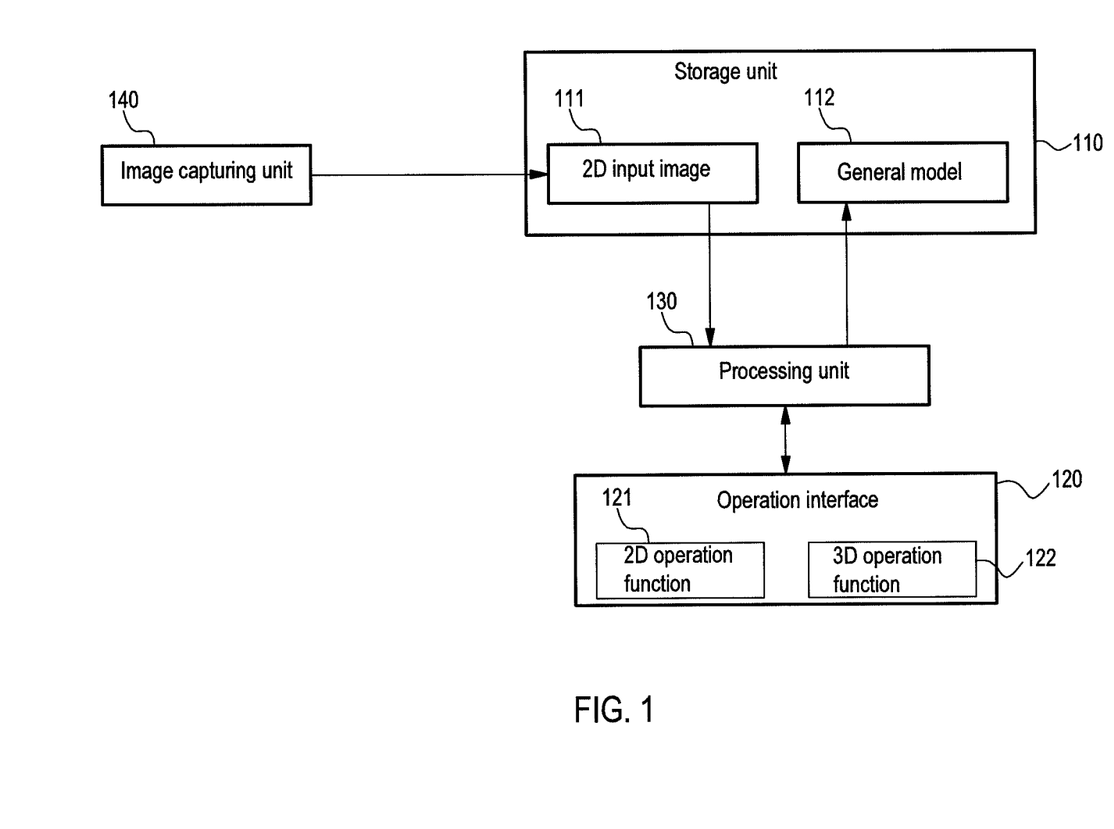
FIG. 1 is a block diagram of elements of a system for combining a 2D image and a 3D model according to the present invention.

FIG. 1 is a block diagram of elements of a system for combining a 2D image and a 3D model according to the present invention. The system for combining the 2D image and the 3D model according to the present invention mainly comprises a storage unit 110, an operation interface 120, and a processing unit 130. Sometimes the system further comprises an image capturing unit. In other embodiments, the image capturing unit 140 acquires a 2D input image 111 and stores the 2D input image 111 in the storage unit 110. The image capturing unit 140 and the storage unit 110 can be linked proximally, and can also be remotely linked via a communication network (not shown in FIG. 1).

The system can prestore a general model 112. The operation interface 120 has a 2D operation function 121 and a 3D operation function 122. The 2D operation function 121 is used for displaying the 2D input image 111 and designating a feature point (not shown, which is described hereinafter) on the 2D input image 111, the 3D operation function 122 is used for performing a 3D space display operation on the general model 112, so as to decide a viewpoint space vector, display the general model, and specify a confirmation point corresponding to the feature point (not shown, which is described hereinafter) on the general model 112. The processing unit 130 decides a display space vector of the 2D input image 111 according to the viewpoint space vector.

In other embodiments, the storage unit 110 can store a plurality of 2D input images, and the processing unit 130 can be as discussed above, which decides a display space vector of each 2D input image, respectively. When the operation interface 120 displays the 3D model 112 according to a specific viewpoint space vector, the processing unit 130 can select a 2D input image having a display space vector corresponding to the specific viewpoint space vector according to the specific viewpoint space vector and the display space vector of each 2D input image, and the 2D input image is displayed by the operation interface. For example, the display space vectors of the plurality of 2D input images are (x1,y1,z1), (x2,y2,z2), (x3,y3,z3), . . . , respectively, and the specific viewpoint space vector is (a,b,c). When selecting the corresponding display space vector, the processing unit 130 compares (a,b,c) with (x1,y1,z1), (x2,y2,z2), (x3,y3,z3), . . . , to find out whether one among (x1,y1,z1), (x2,y2,z2), (x3,y3,z3), . . . , is identical with (a,b,c), or a difference between (a,b,c) and anyone among (x1,y1,z1), (x2,y2,z2), (x3,y3,z3), . . . and so on is within an error value range, or select one from the plurality of comparison results having the minimum difference. The space vector difference is calculated by using, for example, the Pythagorean theorem, that is, a quadratic sum of projection lengths on the coordinate axes is equal to a square of a vector length, so as to learn a vector length through subtraction of the two vectors, and the picture with the space vector having the minimum difference value is selected for display. In another difference calculation mode, the space vectors are converted into included angles between viewpoints and X, Y, Z axes of the 3D space coordinate, so as to find one with the minimum viewpoint difference.

In other embodiments, the general model has a 3D space coordinate system, that is, a model without individual features, such as a mere head shape, body shape, and vehicle model.

In other embodiments, the 2D input image has a camera focal length data, and a size of the corresponding 2D input image when being displayed is decided according to the camera focal length data. For example, when the general model is displayed according to a viewpoint space vector, although a display space vector of the 2D input image can be decided, a displayed picture of the general model and a displayed picture of the 2D input image may have different proportions. For example, in a head of a general model, a picture area of a displayed eye is about 10 square centimeters, but in the 2D input image, a picture area of the eye is about 5 square centimeters, so a large visual difference exists. At this time, the processing unit 130 can perform calibration and modification according to the camera focal length data, so as to zoom in or out the 2D input image, so that the display proportions of the general model and the 2D input image are approximately the same. In another mode of adjusting display proportions of the general model and the 2D input image, the calibration and modification can also be performed by analyzing plane areas of object projection.

In some embodiments of the present invention, a parameter of an included angle between the 2D input image and the plane can be further stored, so as to decide a picture rotation angle of the 2D input image relative to an axis perpendicular to the 2D input image when the 2D input image is displayed. That is to say, a parameter of an included angle between a long side of the 2D input image and a plane of the 3D space is stored, so as to avoid a possible picture autorotation problem during corresponding display.

In other embodiments, the processing unit 130 decides a display coordinate of the feature point according to a coordinate of the confirmation point in a 3D space coordinate system, for example, uses a 3D coordinate value of the confirmation point as a display coordinate value of the feature point, and records the display coordinate value in a related data of the 2D input image in which the display coordinate value is. When the operation interface displays the general model, it can be acquired whether a confirmation point exists in a displayed picture of the general model. When judging that the confirmation point exists, the operation interface can search related data of a plurality of 2D input images according to the coordinate value of the confirmation point, and see whether a conforming feature point coordinate value exists, and uses a conforming 2D input image as an auxiliary reference when the processing unit 130 selects the 2D input image. For example, the processing unit 130 can first find out multiple 2D input images conforming to the coordinate value of the confirmation point according to the 3D coordinate value of the confirmation point, and then perform comparison of the display space vector on the conforming 2D input images.

In the description of the following embodiments, the 2D input image is a 2D pathology image of a human body, but the present invention is not limited thereto, and any 2D image is applicable.

Figure 2A:
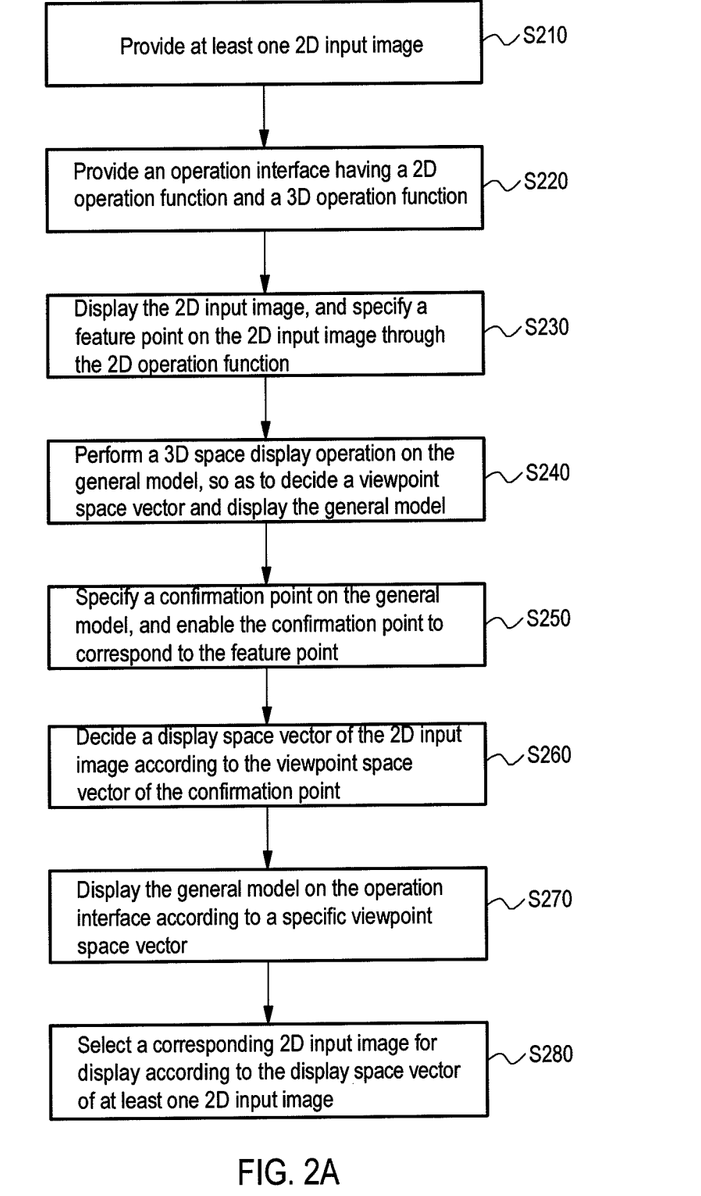
FIG. 2A is a flow chart of steps of a method for combining a 2D image and a 3D model according to the present invention.
Figure 2B:
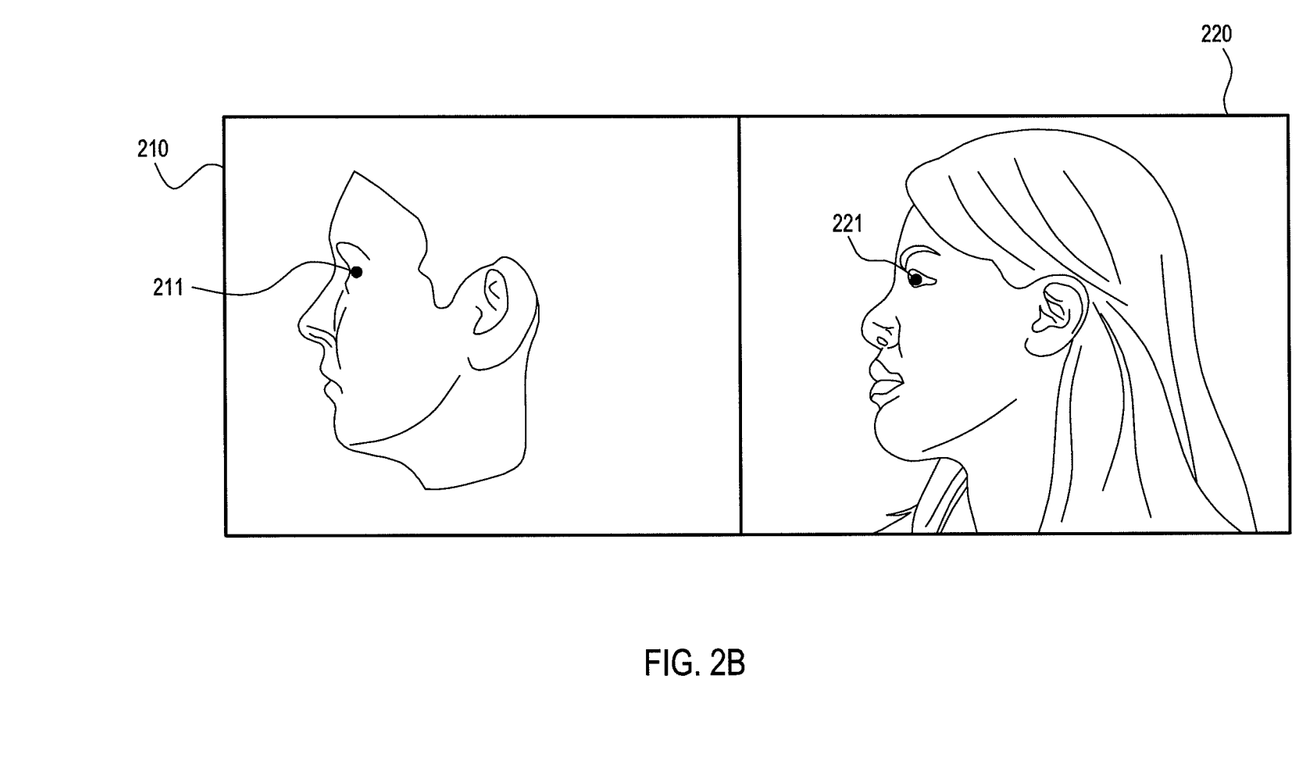
FIG. 2B is a schematic view of an operation interface in FIG. 2A.

Referring to FIGS. 2A and 2B at the same time, FIG. 2A is a flow chart of steps of a method for combining a 2D image and a 3D model according to the present invention, and FIG. 2B is a schematic view of an operation interface in FIG. 2A. In the method for combining the 2D image and the 3D model according to the present invention, before the following steps, a general model is first provided, and the method mainly comprises Steps S210 to S260.

In Step S210, at least one 2D input image is provided.

In this embodiment, the general model is a universal 3D model. Therefore, a user can combine a randomly acquired 2D input image and the general model, instead of otherwise establishing a new general model according to different objects.

In Step S220, an operation interface is provided, and the operation interface has a 2D operation function and a 3D operation function.

In Step S230, the 2D operation function of the operation interface displays a 2D input image and specifies a feature point on the 2D input image. As shown in FIG. 2B, a feature point 221 is specified on the 2D input image 220. For example, a function key is provided to activate a function of designating a feature point, so the user can designate through direct click on the 2D input image by operating a mouse.

In Step S240, the 3D operation function of the operation interface performs a 3D space display operation on the general model, so as to decide a viewpoint space vector and display the general model. For example, in this embodiment, the user has to adjust the general model to rotate to an angle having the same visual effect as the 2D input image through the 3D operation function for display, so in the 3D operation function the viewpoint space vector at this time can be obtained. This is a conventional technology of the 3D model system, and is not repeated here.

In Step S250, the 3D operation function of the operation interface specifies a confirmation point on the general model, and enables the confirmation point to correspond to the feature point. As shown in FIG. 2B, a confirmation point 211 is specified on the general model 210.

In Step S260, according to the viewpoint space vector of the confirmation point, a display space vector of the 2D input image is decided.

Furthermore, the method further comprises following Steps S270 to S280.

In Step S270, the operation interface displays the general model on the operation interface according to a specific viewpoint space vector.

In Step S280, according to the display space vector of at least one 2D input image, a corresponding 2D input image is selected for display.

In this embodiment, according to a coordinate of the confirmation point in the 3D space coordinate system, a display coordinate of the feature point is decided, when the operation interface displays the general model according to a specific viewpoint space vector, a corresponding 2D input image is selected according to the viewpoint space vector, the coordinate of the confirmation point, the display space vector of at least one 2D input image, and the display coordinate of the feature point, and the operation interface displays the 2D input image.

In this embodiment, the displayed 2D input image is switched by operating the general model combined with the 2D input image, so as to provide an instinctive operation display effect. When a universal 3D model is used, modeling operation becomes unnecessary, and the image can be further endowed with sense of shapes and positions by establishing the correlation with the model only. A comprised perspective image can also be correlated and viewed. By using the universal 3D model, correlation with a plurality of 2D input images of the specific object (for example, a patient) is established, and the viewer (for example, a doctor) can instinctively manipulate the general model through a system of 3D viewing operations, so the 2D input image corresponding to the same angle of the general model is displayed in real time, so as to achieve an effect of in-site viewing. Even other body parts without feature relations can also be operated and switched to view because of correlation established with the universal model.

In some embodiments of the present invention, in Step S240, a parameter of an included angle between the 2D input image and the plane can be further stored, so as to decide a picture rotation angle of the 2D input image perpendicular to an axis of the 2D input image when the 2D input image is displayed. Subsequently in S260, when the 2D input image is displayed, an included angle between a long side of the 2D input image to be displayed and the plane of the 3D space can be further calculated, so as to confirm whether the 2D input image corresponds to the 3D model.

Figure 3A:
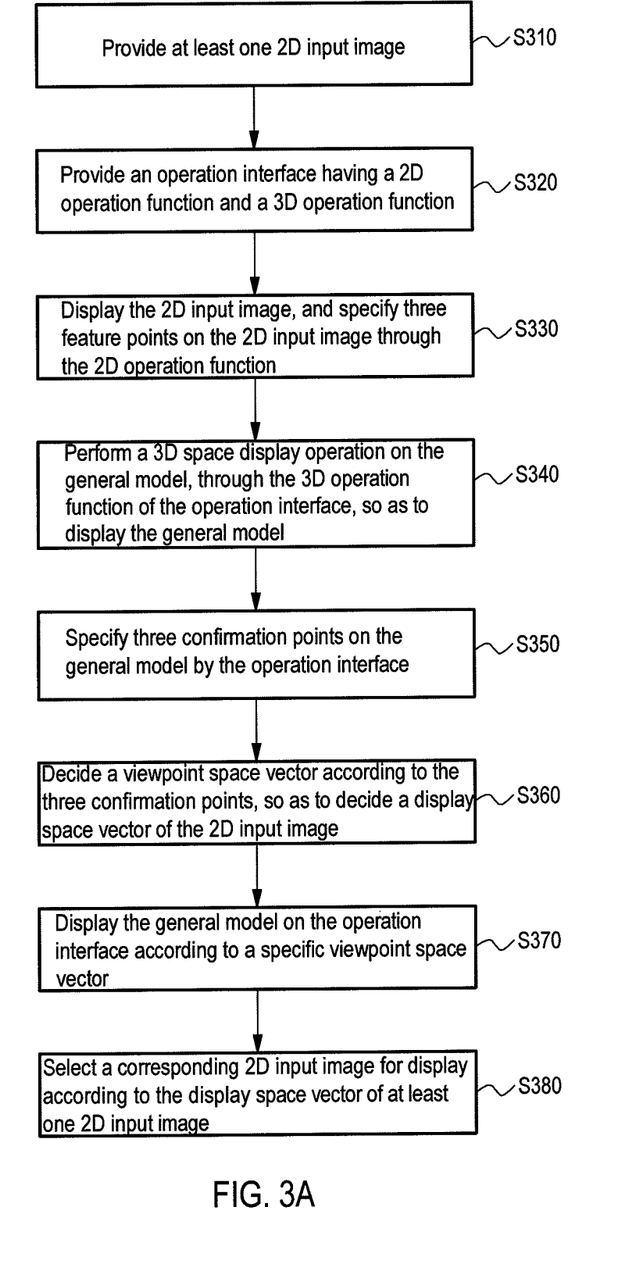
FIG. 3A is a flow chart of steps of a method for combining a 2D image and a 3D model according to another embodiment of the present invention.
Figure 3B:
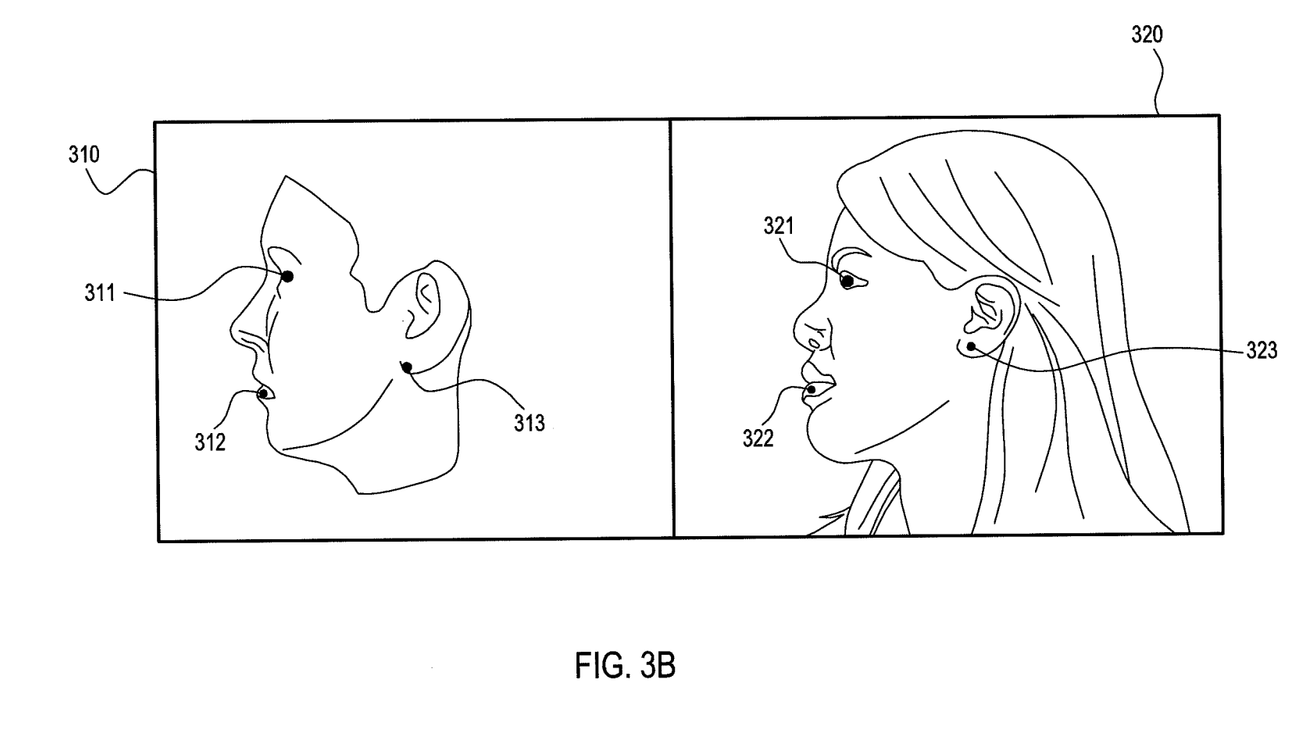
FIG. 3B is a schematic view of an operation interface in FIG. 3A.

Referring to FIGS. 3A and 3B at the same time, FIG. 3A is a flow chart of steps of a method for combining a 2D image and a 3D model according to another embodiment of the present invention, and FIG. 3B is a schematic view of an operation interface in FIG. 3A. In this embodiment, a method adopted when the technology is applied in remote medical care is mainly described. Before the following steps, a universal 3D model needs to be established in the system, and the method mainly comprises Steps S310 to S360.

In Step S310, at least one 2D input image is provided.

The 2D pathology image is acquired from a body part of a patient, and when the doctor needs to diagnose a disease of the patient through the general model, the established universal 3D model can be applicable to various users without having to spend time to further establish a corresponding 3D model for each patient according to each different patient.

In Step S320, an operation interface is provided, and the operation interface has a 2D operation function and a 3D operation function.

In Step S330, the 2D operation function of the operation interface displays the 2D input image and specifies three feature points on the 2D input image. As shown in FIG. 3B, a feature point 321, a feature point 322, and a feature point 323 are specified on the 2D input image 320.

In Step S340, the 3D operation function of the operation interface performs a 3D space display operation on the general model, so as to display the general model.

In this embodiment, the general model does not need to rotate to an angle having the same visual effect as the 2D input image, as long as angles of three confirmation points matched with the three feature points on the 2D input image can be clicked on the general model.

In Step S350, the operation interface specifies three confirmation points on the general model. As shown in FIG. 3B, a confirmation point 311, a confirmation point 312, and a confirmation point 313 are specified on the general model 310.

In Step S360, a viewpoint space vector is decided according to the three confirmation points, so as to decide a display space vector of the 2D input image.

Furthermore, the method further comprises following Steps S370 to S380.

In Step S370, the general model is displayed on the operation interface according to a specific viewpoint space vector.

In Step S380, according to a display space vector of at least one 2D input image, a corresponding 2D input image is selected for display.

In some embodiments of the present invention, a viewpoint space vector is decided according to three confirmation points; three feature points such as a (x1,y1), b (x2,y2), c (x3,y3) can be taken on the 2D input image; and corresponding to the general model coordinates A, B, C, respectively, as the proportion between the image and the model is defined, the reference point a is taken; corresponding to a relative point A of the general model, and through values of vectors ab and ac, the 3D model is projected to plane coordinates; the vector values thereof corresponding to the reference point and other two points are adjusted to rotate, thus obtaining a unique corresponding result with the values of vectors ab and ac, and acquiring an angle and direction of the rotation of the image corresponding to the 3D model, so as to decide a viewpoint space vector, thus deciding the display space vector of the 2D input image.

In some other embodiments of the present invention, the three feature points on the 2D image and the three confirmation points respectively corresponding to each feature point on the general model can be automatically detected and decided through the image analysis and detection technology. For example, when the 2D input image is a face photo and the general model is a head model, according to a conventional face feature detection technology (such as template matching, qualitative model of face pattern, a boundary operation technology Marr-Hildreth, and a face feature image categorizer), at least three face feature points on the 2D input image can be decided, for example, a center point of a left eyeball, a center point of a right eyeball, a nose tip point, a lower junction point between a left ear and a face, and a lower junction point between a right ear and a face. 3D coordinates of the face feature points can be defined on a head model in advance, so once the feature point on the 2D input image is automatically detected, the 3D coordinates on the head model can be can automatically corresponded.

The correlation between a plurality of 2D input images of a patient and the universal 3D model is established for use, so the doctor instinctively manipulates the universal 3D model through the system of the 3D view operation, so as to display the 2D input images corresponding to the same angles of the universal 3D model in real time, thus achieving the effect of on-site viewing. Even other body parts without feature relations can also be operated and switched to view arbitrarily because of the correlation established with the universal model.

Figure 4:
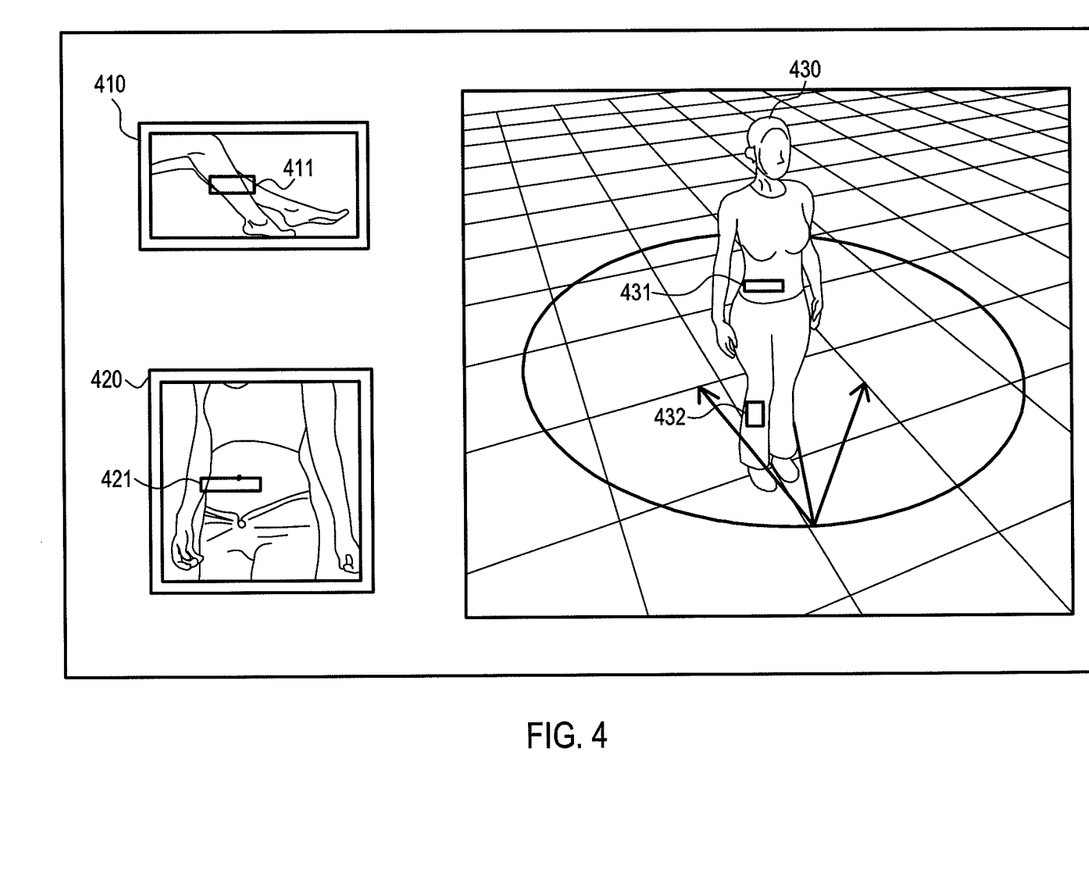
FIG. 4 is a schematic view of a 2D image corresponding to a 3D model according to an embodiment of the present invention.

FIG. 4 is a schematic view of a 2D input image corresponding to a 3D model according to an embodiment of the present invention. In FIG. 4, the universal 3D model 430 is established in advance; an image capturing device acquires a 2D leg picture 410 and a 2D belly picture 420, a leg injury 411 is marked on the 2D leg picture 410, and a belly injury 421 is marked on the 2D belly picture 420; next, in the 2D leg picture 410 and the 2D belly picture 420, respective feature points are found and marked on the 2D leg picture 410 and the 2D belly picture 420. Subsequently, the universal 3D model 430 finds confirmation points corresponding to the leg injury 411 and the belly injury 421, and marks the leg injury 411 and the belly injury 421 on the universal 3D model 430, so as to establish correlations between the 2D leg picture 410 and the universal 3D model 430 and between the 2D belly picture 420 and the universal 3D model 430, thus attaching the leg injury 411 to a leg mark 432 of the universal 3D model 430 and attaching the belly injury 421 to a belly mark 431 of the universal 3D model 430.

In this embodiment, a feature point on the 2D leg picture 410 and the 2D belly picture 420 can correspond to a confirmation point on the universal 3D model 430, respectively, or three feature points on the 2D leg picture 410 and the 2D belly picture 420 correspond to three confirmation points on the 3D model 430.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A method for combining a 2D image and a 3D model, wherein a general model is pre-stored, the method comprising:

providing a 2D input image;

providing an operation interface having a 2D operation function and a 3D operation function, wherein the 2D operation function is used for displaying the 2D input image and designating a feature point on the 2D input image, and the 3D operation function is used for performing a 3D space display operation for the 3D model so as to decide a viewpoint space vector, display the 3D model, and specify a confirmation point corresponding to the feature point on the 3D model; and deciding a display space vector of the 2D input image according to the viewpoint space vector.

2. The method for combining a 2D image and a 3D model according to claim 1, further comprising:

providing a plurality of 2D input images, and deciding the display space vector of each 2D input image respectively through the steps;

displaying the 3D model by the operation interface according to a specific viewpoint space vector; and selecting the 2D input image having the display space vector corresponding to the specific viewpoint space vector according to the specific viewpoint space vector and the display space vector of each 2D input image, and displaying the 2D input image by the operation interface.

3. The method for combining a 2D image and a 3D model according to claim 1, wherein the 3D model has a 3D space coordinate system.

4. The method for combining a 2D image and a 3D model according to claim 1, wherein the 3D operation function comprises one of operations of rotating, moving, and zooming in/out the 3D model.

5. The method for combining a 2D image and a 3D model according to claim 1, wherein the 2D input image has camera focal length data, and the method further comprises:

zooming in or out the 2D input image according to the camera focal length data when displaying the corresponding 2D input image.

6. The method for combining a 2D image and a 3D model according to claim 1, further comprising:

deciding a display coordinate of the feature point according to a coordinate of the confirmation point in a 3D space coordinate system, when the operation interface displays the 3D model according to a specific viewpoint space vector, selecting the corresponding 2D input image according to the viewpoint space vector, the coordinate of the confirmation point, the display space vector of at least one 2D input image, and the display coordinate of the feature point, and displaying the 2D input image by the operation interface.

7. A method for combining a 2D image and a 3D model, wherein a general model is pre-stored, the method comprising:

providing a 2D input image;

providing an operation interface having a 2D operation function and a 3D operation function, wherein the 2D operation function is used for displaying the 2D input image and designating three feature points on the 2D input image, and the 3D operation function is used for performing a 3D space display operation on the 3D model, and specifying three confirmation points respectively corresponding to each feature point on the 3D model; and deciding a viewpoint space vector according to the confirmation points, and deciding a display space vector of the 2D input image according to the viewpoint space vector.

8. The method for combining a 2D image and a 3D model according to claim 7, further comprising:

providing a plurality of 2D input images, and deciding a display space vector of each 2D input image respectively through the steps;

displaying the 3D model by the operation interface according to a specific viewpoint space vector; and selecting a 2D input image having a display space vector corresponding to the specific viewpoint space vector according to the specific viewpoint space vector and the display space vector of each 2D input image, and displaying the 2D input image by the operation interface.

9. The method for combining a 2D image and a 3D model according to claim 7, further comprising:

detecting and deciding the three feature points on the 2D input image and the three confirmation points respectively corresponding to each feature point on the 3D model automatically.

10. A system for combining a 2D image and a 3D model, comprising:

a storage unit, used for storing a 2D input image and a general model;

an operation interface, having a 2D operation function and a 3D operation function, wherein the 2D operation function is used for displaying the 2D input image and designating a feature point on the 2D input image, the 3D operation function is used for performing a 3D space display operation on the general model, so as to decide a viewpoint space vector, display the general model, and specify a confirmation point corresponding to the feature point on the general model; and a processing unit, linked to the storage unit and the operation interface, and used for deciding a display space vector of the 2D input image according to the viewpoint space vector.

11. The system for combining a 2D image and a 3D model according to claim 10, wherein the storage unit further stores a plurality of 2D input images, the processing unit further decides a display space vector of each 2D input image respectively, when the operation interface displays the general model according to a specific viewpoint space vector, the processing unit further selects a 2D input image having a display space vector corresponding to the specific viewpoint space vector according to the specific viewpoint space vector and the display space vector of each 2D input image, and the operation interface displays the 2D input image.

12. The system for combining a 2D image and a 3D model according to claim 10, wherein the 3D model has a 3D space coordinate system.

13. The system for combining a 2D image and a 3D model according to claim 10, wherein the 3D operation function comprises one of operations of rotating, moving, and zooming in/out the 3D model.

14. The system for combining a 2D image and a 3D model according to claim 10, wherein the 2D input image has a camera focal length data, and when displaying the corresponding 2D input image, the operation interface zooms in or out the 2D input image according to the camera focal length data.

15. The system for combining a 2D image and a 3D model according to claim 10, wherein the processing unit further decides a display coordinate of the feature point according to a coordinate of the confirmation point in the 3D space coordinate system, when the operation interface displays the general model according to a specific viewpoint space vector, the processing unit further selects a corresponding 2D input image according to the viewpoint space vector, the coordinate of the confirmation point, the display space vector of at least one 2D input image, and the display coordinate of the feature point, and the operation interface displays the 2D input image.

16. The system for combining a 2D image and a 3D model according to claim 10, further comprising an image capturing unit, used for capturing the 2D input image and storing the 2D input image in the storage unit.

17. A system for combining a 2D image and a 3D model, comprising:
- a storage unit, used for storing a 2D input image and a general model;
- an operation interface, having a 2D operation function and a 3D operation function, wherein the 2D operation function is used for displaying the 2D input image and designating three feature points on the 2D input image, and the 3D operation function is used for performing a 3D space display operation on the general model, and specifying three confirmation points respectively corresponding to each feature point on the general model; and
- a processing unit, linked to the storage unit and the operation interface, and used for deciding a viewpoint space vector according to the confirmation points, and deciding a display space vector of the 2D input image according to the viewpoint space vector.

18. The system for combining a 2D image and a 3D model according to claim 17, wherein the storage unit further stores a plurality of 2D input images, the processing unit further decides a display space vector of each 2D input image respectively, when the operation interface displays the general model according to a specific viewpoint space vector, the processing unit further selects a 2D input image having a display space vector corresponding to the specific viewpoint space vector according to the specific viewpoint space vector and the display space vector of each 2D input image, and the operation interface displays the 2D input image.

19. The system for combining a 2D image and a 3D model according to claim 17, wherein the processing unit is further used for:
- detecting and deciding three feature points on the 2D input image, and three confirmation points respectively corresponding to each feature point on the general model automatically.

20. A non-transitory computer readable storage medium, for storing a computer program, wherein the computer program is loaded by a computer to execute a method for combining a 2D image and a 3D model, comprising:
- a general model;
- a first program code, used for receiving a 2D input image;
- a second program code, used for providing an operation interface, wherein the operation interface has a 2D operation function and a 3D operation function, the 2D operation function is used for displaying the 2D input image and designating a feature point on the 2D input image, the 3D operation function is used for performing a 3D space display operation on the general model, so as to decide a viewpoint space vector, display the general model, and specify a confirmation point corresponding to the feature point on the general model; and
- a third program code, used for deciding a display space vector of the 2D input image according to the viewpoint space vector.

21. A non-transitory computer readable storage medium, for storing a computer program, wherein the computer program is loaded by a computer to execute a method for combining a 2D image and a 3D model, comprising:
- a general model;
- a first program code, used for providing a 2D input image;
- a second program code, used for providing an operation interface, wherein the operation interface has a 2D operation function and a 3D operation function, the 2D operation function is used for displaying the 2D input image and designating three feature points on the 2D input image, and the 3D operation function is used for performing a 3D space display operation on the 3D model and specifying three confirmation points respectively corresponding to each feature point on the 3D model; and
- a third program code, used for deciding a viewpoint space vector according to the confirmation points, and deciding a display space vector of the 2D input image according to the viewpoint space vector.

* * * * *